(12) United States Patent
Sandmeier

(10) Patent No.: US 8,152,151 B2
(45) Date of Patent: Apr. 10, 2012

(54) CLAMPING FIXTURE INCLUDING A CHUCK AND A WORKPIECE PALLET RELEASABLY LOCATED THEREON

(75) Inventor: Bruno Sandmeier, Seengen (CH)

(73) Assignee: Erowa AG, Reinach (CH)

(*) Notice: Subject to any disclaimer, the term of this patent is extended or adjusted under 35 U.S.C. 154(b) by 1112 days.

(21) Appl. No.: 12/011,236

(22) Filed: Jan. 25, 2008

(65) Prior Publication Data

US 2009/0051094 A1 Feb. 26, 2009

(30) Foreign Application Priority Data

Jan. 30, 2007 (CH) ........................................ 0154/07

(51) Int. Cl.
*B23Q 3/00* (2006.01)
(52) U.S. Cl. ............. 269/309; 269/310; 269/32; 269/20
(58) Field of Classification Search .................. 269/309, 269/310, 32, 20; 279/46.1, 133, 46.7, 157; 277/551, 572, 423
See application file for complete search history.

(56) References Cited

U.S. PATENT DOCUMENTS

| | | | | | |
|---|---|---|---|---|---|
| 2,105,777 | A | * | 1/1938 | Smith, Sr. ...................... | 277/572 |
| 2,453,262 | A | * | 11/1948 | Peters .......................... | 279/2.03 |
| 2,496,545 | A | * | 2/1950 | Kraemer ........................ | 82/150 |
| 2,905,477 | A | * | 9/1959 | Buck et al. .................... | 279/123 |
| 2,909,376 | A | * | 10/1959 | Drew ............................. | 279/20 |
| 3,248,121 | A | * | 4/1966 | Volpe ............................. | 279/71 |
| 3,762,264 | A | | 10/1973 | Scott | |
| 4,232,934 | A | * | 11/1980 | Feinbloom ..................... | 385/88 |
| 4,348,165 | A | | 9/1982 | Vostrovsky | |
| 5,567,093 | A | * | 10/1996 | Richmond ..................... | 409/136 |
| 5,961,261 | A | * | 10/1999 | Stark ............................. | 409/219 |
| 6,568,694 | B1 | * | 5/2003 | White ........................... | 279/133 |
| 6,729,627 | B2 | * | 5/2004 | Komine et al. ................ | 279/157 |
| 6,752,037 | B1 | | 6/2004 | Miyazawa | |
| 6,886,833 | B1 | * | 5/2005 | von Engelbrechten et al. ............................. | 277/551 |
| 6,997,448 | B2 | * | 2/2006 | Roth et al. ..................... | 269/309 |
| 7,303,195 | B2 | * | 12/2007 | Nie ................................ | 279/133 |
| 7,367,552 | B2 | * | 5/2008 | Greber .......................... | 269/309 |
| 7,520,495 | B2 | * | 4/2009 | Stark ............................. | 269/309 |
| 7,648,132 | B2 | * | 1/2010 | Hediger ........................ | 269/310 |

(Continued)

FOREIGN PATENT DOCUMENTS

DE 724892 7/1942
(Continued)

OTHER PUBLICATIONS

EP Search Report for Swiss priority application to present United States application, EP Serial No. 1542007, Jul. 17, 2007 (3 pages).

(Continued)

*Primary Examiner* — George Nguyen
(74) *Attorney, Agent, or Firm* — Maginot, Moore & Beck LLP (57) ABSTRACT

A clamping fixture comprises a chuck (1) and a workpiece pallet (22) releasably located thereon. The chuck (1) is provided with a clamping mechanism for locating the workpiece pallet (22). The clamping mechanism comprises a plurality of clamping members configured as plungers (10). The workpiece pallet (22) comprises a clamping surface (28a) running essentially along its shell surface (26) for surface contacting the plungers (10) by its front part (12) provided with a compression surface (13) during clamping.

25 Claims, 5 Drawing Sheets

U.S. PATENT DOCUMENTS

2004/0256780 A1 * 12/2004 Lang .................... 269/309
2005/0248103 A1    11/2005 Kramer

FOREIGN PATENT DOCUMENTS

| DE | 10117485 A1 | 10/2002 |
| DE | 102004006370 A1 | 5/2005 |
| EP | 0864410 A1 | 9/1998 |
| WO | WO 2006103041 A | 10/2006 |

OTHER PUBLICATIONS

English translation of abridged abstract for reference of German patent No. DE 102004006370 (1 page).

* cited by examiner

CLAMPING FIXTURE INCLUDING A CHUCK AND A WORKPIECE PALLET RELEASABLY LOCATED THEREON

BACKGROUND

The present invention relates to clamping fixtures, such as clamping fixtures put to use for clamping workpiece pallets provided with a tool or workpiece positionally defined, the chuck usually being fixedly located on a work table of a machine tool or a press whilst the workpiece pallet is repeatedly releasably located precisely positioned at the chuck.

Whilst with known clamping fixtures the resulting compression forces are transmitted mostly via large contact surfaces provided for this purpose, tensile forces in general have to be handled by a clamping mechanism provided with clamping members. Such a clamping mechanism usually features a plurality of spring-loaded clamping balls which when the workpiece pallet is clamped in place engage a clamping surface of a clamping post secured to the workpiece pallet or directly engage the workpiece pallet itself. Although clamping fixtures of this kind have a proven record of success, for some applications it would be an advantage when the workpiece pallet is able to handle higher tensile forces. One example of such an application is a powder press where a ram for compacting the powder is secured to the workpiece pallet. Where not only the face of the ram but especially also its inner and/or outer shell surfaces is/are involved in the actual molding action, correspondingly high withdrawal forces need to be applied to retract the ram from the die so that the ram can be withdrawn axially from the highly compacted mass of powder.

Thus, it may certainly be the case that for withdrawing the ram more than 30% of the compacting force needs to be applied in the tensile direction. In other words, when, for example, to produce a compact of ferrous or ceramic powder a compacting force of 100 tonnes needs to be applied, to remove the ram 30 tonnes or more need to be applied in the tensile direction. Where the ram is secured to a workpiece pallet, these forces must, of course, also be transmitted from the workpiece pallet to the chuck. It will be appreciated that such high withdrawal forces cannot be handled by a conventional ball clamping mechanism because due to the very small contact surface of the balls the surface compression would be much too high.

Known from EP-A-0 255 042 is a clamping device for a tool of a machine tool comprising a chuck and a tool holder. The chuck comprises two pairs of centering rails protruding from its underside which in the X and Y direction are provided with contact surfaces for aligning the tool holder Provided furthermore are four posts protruding from the surface of the chuck which are responsible for aligning the tool holder in the Z direction. The tool holder comprises a flat surface defined to contact the faces of the aforementioned posts. Provided furthermore in the tool holder are two pairs of grooves aligned with the centering rails and featuring flexible lips provided to contact the rails. In conclusion, the tool holder features a center bore for receiving a draw bar with the aid of which the clamping force needed to center the workpiece pallet correctly positioned is transmitted. In this arrangement the chuck comprises a centrally located ball lock which cooperates with said draw bar. It will be appreciated that only relatively small tensile forces can be transmitted via the draw bar and the ball lock.

Described in EP-A-0 827 806 is a clamping cylinder for clamping a pull-in nipple. The clamping cylinder is provided with a central bore serving to receive the pull-in nipple. The clamping cylinder features a first outer piston and a second piston located radially within the first. Disposed between the two pistons is a plurality of clamping members, termed locking pistons serving to clamp the pull-in nipple in place. These locking pistons engage a lug arranged at the front end of the pull-in nipple, several locking pistons being arranged evenly distributed circumferentially. The two pistons are axially movable together with the locking pistons which are additionally adjustable radially. The outer piston is provided with an inclined surface and loaded axially by means of compression springs such that it is caused to urge the locking pistons radially inwards by the inclined surface. The locking pistons are configured as plunger members. Piston release is done hydraulically. One serious drawback of this clamping cylinder is that a pallet pull-in nipple is pliable in the extension direction and can only handle relatively small forces since the locking pistons come into contact with only a comparatively small contact surface of the pull-in nipple and the piston locating the pull-in nipple via the locking pistons in the Z direction is loaded only by the compression springs in the extension direction.

Known furthermore from EP-A-1 068 919 is a clamping apparatus capable of handling comparatively high tilting and torque loads. The clamping apparatus comprises a chuck to be located in the working range of the machine tool and a workpiece carrier means for mounting on the chuck for clamping thereto. First positioning means on the chuck and second positioning means on the workpiece carrier means cooperate paired as alignment members for positioning the workpiece carrier means in the X, Y and Z direction. To clamp the workpiece carrier means in the position defined by the positioning means on the chuck, a clamping device is likewise provided. The latter comprises sited along a circular ring a plurality of clamping balls the active lines of which in their clamping force are located substantially on or in the region of an imaginary cylindrical shell parallel to the Z axes cutting the first and second positioning means. Compressive loading is transmitted from the workpiece carrier means to the chuck primarily via Z contact surfaces at which the workpiece carrier means comes to rest when clamping the chuck. Although, on the one hand, such a clamping apparatus is capable, of handling comparatively high compressive loads and also of transmitting high torques as well as tilting moments, on the other, transmission of tensile forces is limited for reasons as recited above the outset.

SUMMARY

The invention has one object of sophisticating a clamping fixture including a chuck and a workpiece pallet releasably located thereon such that the workpiece pallet can now also handle high tensile loads.

One gist of the invention is that the chuck is now provided with plunger-type clamping members engaging the outer side of the workpiece pallet, namely a clamping surface running essentially along the shell surface, over a large surface area. This meets the basic requirement of the workpiece pallet being capable of handling high tensile forces in transmitting them to the chuck, since as compared to a clamping post a clamping surface running along the shell surface of the workpiece pallet now offers a substantially larger contact surface for the clamping members.

To ensure that the workpiece pallet when being clamped to the chuck is positioned with high absolute, repeatable accuracy first centering members are arranged on the chuck which cooperate with further centering members on the workpiece pallet such that the workpiece pallet is positioned relative to the chuck in the X and Y direction on clamping.

DESCRIPTION OF THE FIGURES

A preferred example aspect of the clamping fixture in accordance with the invention will now be detailed with reference to the attached drawings in which.

DESCRIPTION OF THE EMBODIMENTS

Figure 1:
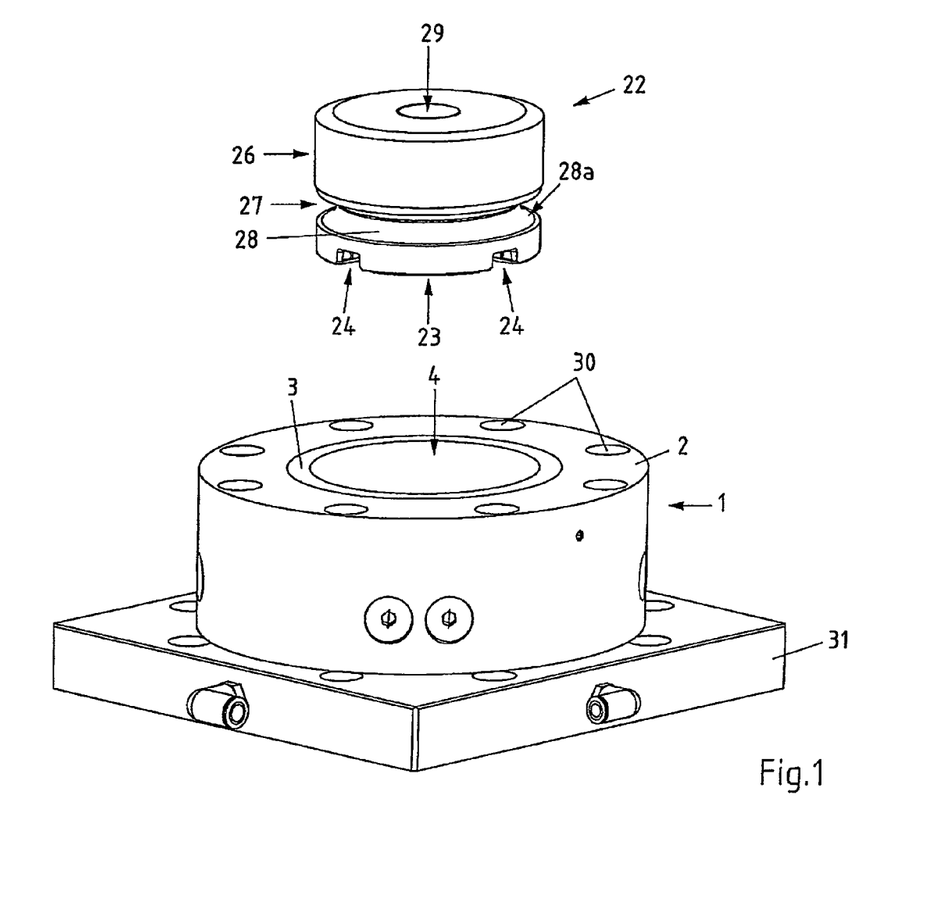
FIG. 1 is a view in perspective of the clamping fixture comprising a chuck and a workpiece pallet.

Referring now to FIG. 1 there is illustrated a view in perspective of a clamping fixture comprising a chuck 1 and a workpiece pallet 22. The chuck 1 is secured to a base plate 31, but it is just as possible that the chuck 1 is directly secured to the machine table. The workpiece pallet 22 serves to mount workpieces repeatedly precisely located on the chuck 1. However, the term workpiece pallet in the present context is not at all to be understood as only serving to mount workpieces, since tools and the like can be secured just as well.

The chuck 1 comprises a cylindrical base body 2 lined with a liner 3. This liner 3 circumscribes a central aperture 4 serving to mount the workpiece pallet 22 configured substantially cylindrical. The flat underside 23 of the workpiece pallet 22 features centering grooves 24 for engaging centering cams arranged on the chuck 1 when the workpiece pallet 22 is located on the chuck 1. The dead fit of the centering cams engaging the centering grooves 24 precisely positions the workpiece pallet 22 in the X and Y direction as well as relative to the angular position about the Z axis when defined on the chuck 1. The workpiece pallet 22 is configured substantially cylindrical and provided with an annular groove 27 machined in the shell surface 26 which defines the outer circumference surface of the workpiece pallet 22. The one sidewall of this annular groove 27 forms a shoulder 28 in serving as a clamping surface 28a engaged by clamping members arranged on the chuck 1 during clamping as will be explained later. The clamping surface 28a is ramped from the outside inwards preferably inclined or curved. The workpiece pallet 22 features a through bore 29 serving, for example, to mount and locate a workpiece or a tool. The base body 2 is fixedly connected to the base plate 31 by a plurality of bolts 30. The fasteners of the workpiece pallet 22 needed to locate a workpiece or tool are not shown.

Figure 2A:
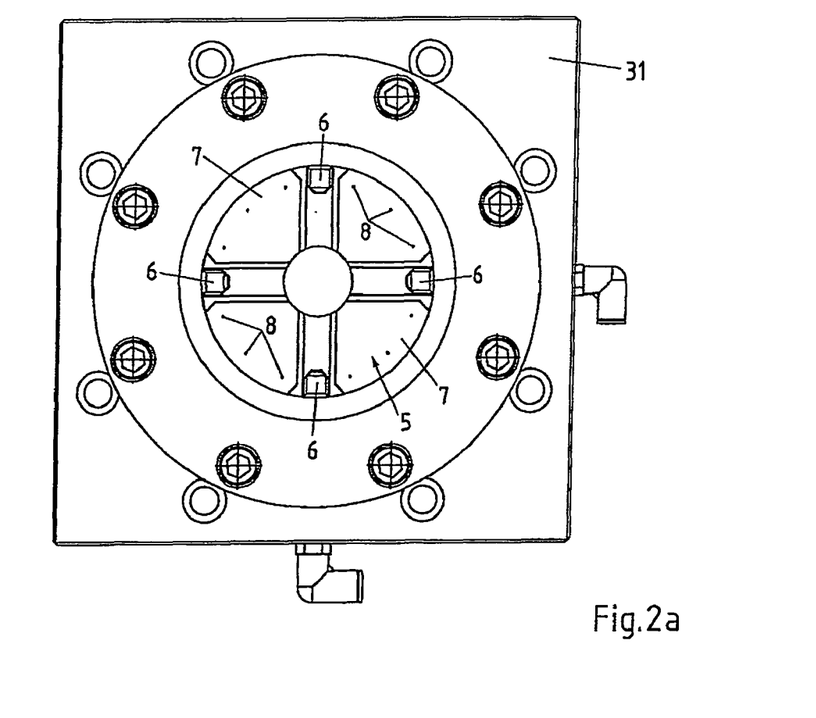
FIG. 2a is top down view of the chuck.

Referring now to FIG. 2a there is illustrated in a top down view the chuck 1 showing a base plate 5 arranged at the bottom of the chuck 1 and which is provided with four centering cams 6 serving to position the workpiece pallet 22. Extending between two neighboring centering cams 6 each is a circular sector shaped supporting surface 7. These circular sector shaped supporting surfaces 7 form together a Z stop for the workpiece pallet 22. For cleaning purposes each of these supporting surfaces 7 is provided with several holes 8 via which air can be jetted so that the underside of the workpiece pallet 22 is cleaned of dirt when being located at the chuck.

Figure 2B:
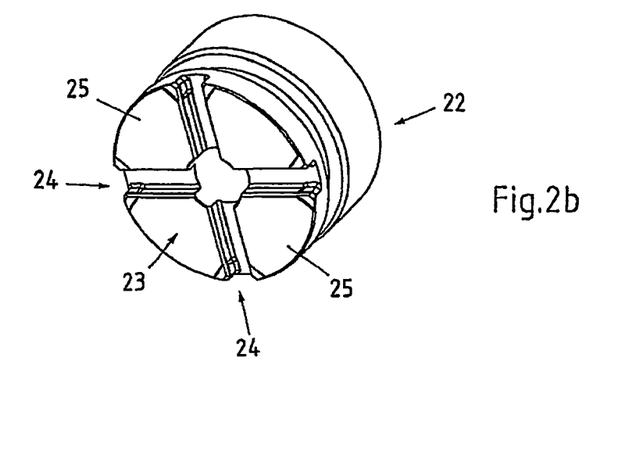
FIG. 2b is a bottom up view of the workpiece pallet shown in perspective.

Referring now to FIG. 2b there is illustrated a bottom up view in perspective of the workpiece pallet 22 showing particularly four grooves 24 machined intersecting in the flat underside 23 which they divide into four flat contact surfaces 25. These grooves 24 correspond in shape and size to the four centering cams 6 of the chuck 1 such that when the workpiece pallet 22 is clamped to the chuck 1 it is aligned in the X and Y direction as well as relative to its angular position about the Z axis.

Figure 3:
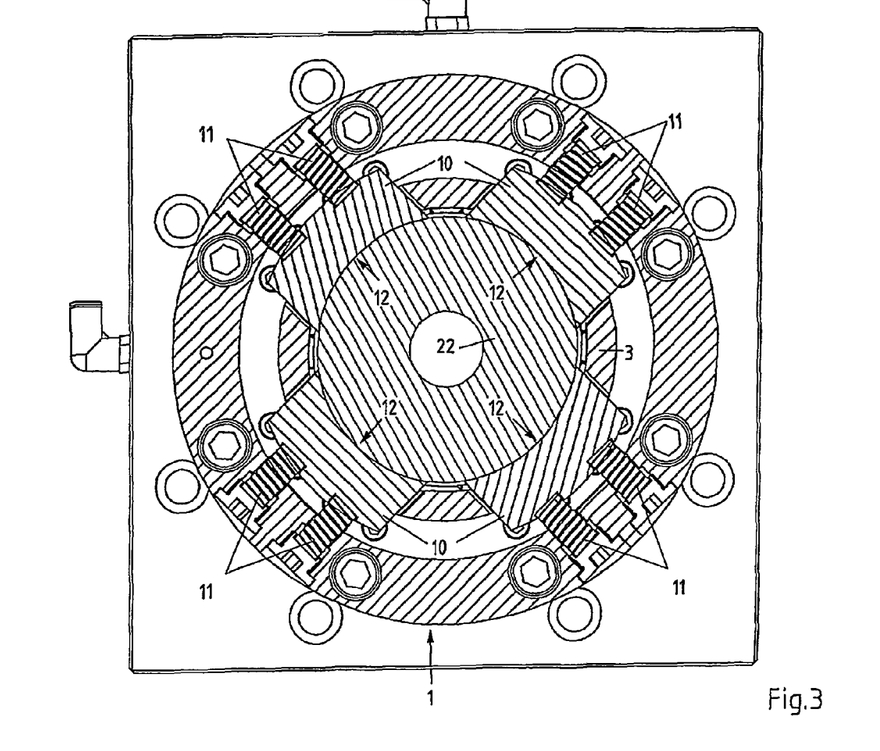
FIG. 3 is a view in horizontal section through the clamping fixture.

Referring now to FIG. 3 there is illustrated in a horizontal sectional view the chuck 1 together with the workpiece pallet 22 located therein, showing in particular four plungers 10 serving to clamp the workpiece pallet 22 to the chuck 1. The four plungers 10 are mounted radially movable in the liner 3 and each offset 90° from other. Each of these four plungers 10 is loaded by means of two compression springs 11 such that it is urged radially inwards in the direction of the workpiece pallet 22 mounted in the chuck 1. The longitudinal centerline of these compression springs 11 runs parallel to the plunging direction of the plungers 10. The solid liner 3 is configured such that it handles tensile forces acting on the plungers 10.

The front part 12 of the plungers 10 is adapted to the contour of the clamping surface 28a of the workpiece pallet 22 such that each plunger 10 comes into surface contact with a shoulder 28 (FIG. 1) of the workpiece pallet 22 forming a clamping surface 28a. Preferably each plunger 10 comes into full surface contact with the clamping surface 28a. The front sides 12 of the four plungers 10 to be arranged facing the workpiece pallet 22 cover together roughly 320° of the circumference of the workpiece pallet 22 so that, unlike conventional ball clamping mechanisms in which the balls have only punctiform contact, a comparatively large contact surface is now achieved between the clamping members—plungers 10—and the workpiece pallet 22. This large contact surface between the chuck 1 and the workpiece pallet 22 forms the basic requirement for the workpiece pallet 22 being capable of handling high tensile forces. But in any case, due to this large surface contact of the plungers 10 with the clamping surface 28a the surface pressurization is relatively small even when very high withdrawal forces are effective.

Figure 4:
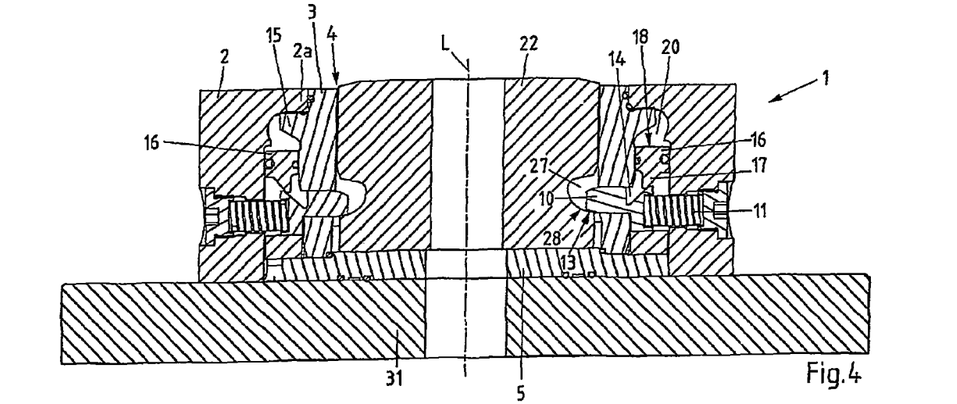
FIG. 4 is a view in vertical section through the clamping fixture in the locked condition.

Referring now to FIG. 4 there is illustrated a vertical section through the clamping fixture in the locked condition showing how each plunger 10 is urged by the compression springs 11 in the direction of the workpiece pallet 22 mounted in the chuck 1. It is due to this biasing force of the springs 11 that the plunger 10 comes into surface contact by its underside acting as a compression surface 13 with the shoulder 28 of the annular groove 27 forming a clamping surface in drawing the workpiece pallet 22 down against the base plate 5 of the chuck 1 until it comes into contact by its flat underside with the supporting surfaces of the chuck 1 in thus positioning it in the Z direction. But, in any case, the profile or inclination of the clamping surface 28a is adapted to the front side of the plungers 10 such that the workpiece pallet 22 in advancing the plungers 10 in the Z direction is drawn down against the base plate 5 of the chuck 1.

In addition to positioning the workpiece pallet in the Z direction it is positioned also in the X and Y direction as well as relative to the angular position about the Z axis in being clamped to the chuck 1. As already explained above this positioning is dictated by the centering cams 6 of the chuck 1 entering the centering grooves 24 of the workpiece pallet 22 (FIGS. 2a, 2b).

To release the workpiece pallet 22 clamped in the chuck 1 the plungers 10 must be urged outwards radially in overcoming the force of the compression springs 11. For this purpose, an actuator in the form of an annular piston 16 is provided, comprising a protuberance 17 machined with a ramped pressure surface for engaging a corresponding recess 14 in the corresponding plungers 10. The substantially flat top side 18 of the annular piston 16 forms at the same time the lower end of an annular pressure chamber 20. When the annular piston 16 moves downwards, its protuberance 17 entering the recess 14 of the plunger 10 urges the plunger 10 radially outwards. The annular piston 16 is actuated preferably pneumatically, by the pressure chamber 20 running above the annular piston 16 receiving a supply of compressed air. Instead of actuating the annular piston 16 pneumatically it is also possible to provide, for example, a hydraulic or electromechanical actuator. But, in any case, on downwards movement of the piston 16 the plungers 10 are plunged transversely to the longitudinal centerline L of the chuck 1 and central aperture 4 respectively.

Further evident from FIG. 4 is how as viewed cross-sectionally the base body 2 is essentially L-shaped by its top side comprising a base part 2a extending substantially radially. The liner 3 is provided with a circumferential shoulder 15 by which it is supported by its full surface at the underside of the base part 2a of the base body 2 when tensile loaded. It is this configuration together with the solid structure of the base body 2 as well as that of the liner 3 that makes it possible that high tensile forces can now be handled by the liner 3 and transmitted to the base body 2.

Figure 5:
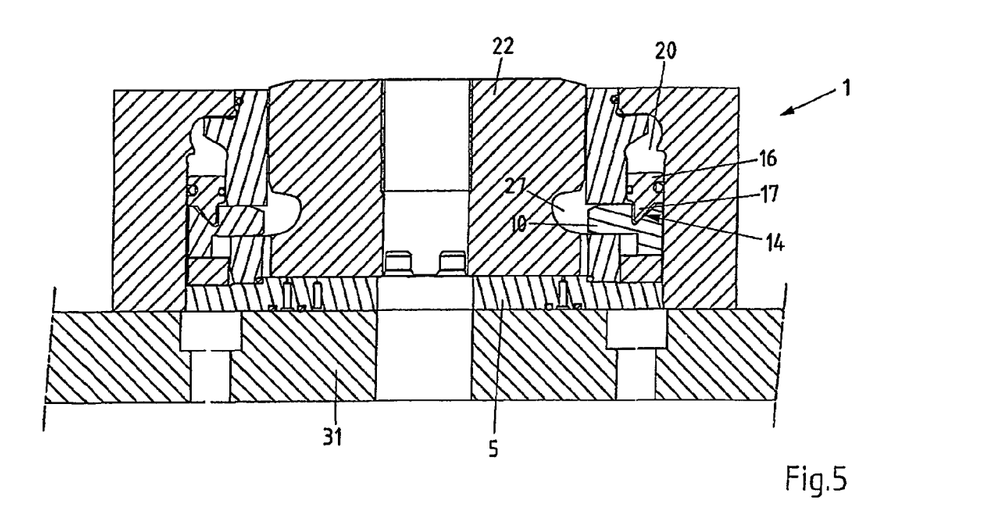
FIG. 5 is a view in vertical section through the clamping fixture in the released condition.

Referring now to FIG. 5 there is illustrated a view in vertical section through the clamping fixture in the released condition, not showing the compression springs. To release the workpiece pallet 22 from the lock, the plungers 10 need to be plunged radially outwards. For this purpose the pressure chamber 20 receives a supply of compressed air and pressurized until the annular piston 16 is urged downwards. This downwards motion of the annular piston 16 causes its protuberance 17 to enter the recess 14 of the plunger 10, urging it radially outwards until its rear side comes into contact with the inner side of the base body 2, enabling the workpiece pallet 22 to be removed from the chuck. Also evident is how the shoulder of the annular groove 27 forming the clamping surface is ramped radially from the outside inwards.

Figure 6:
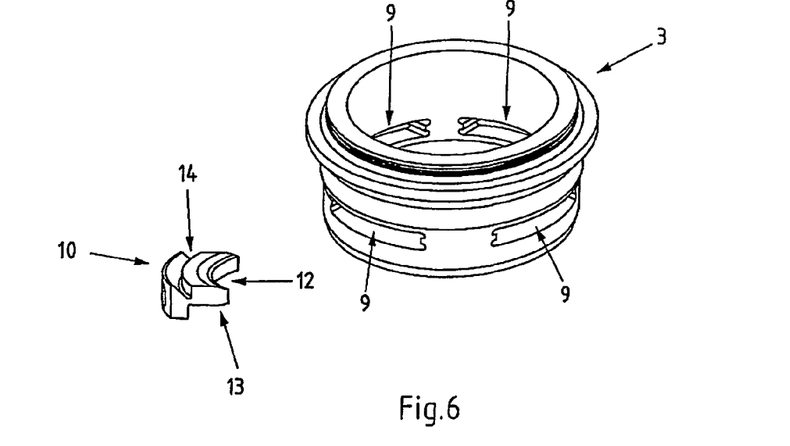
FIG. 6 is a view in perspective showing a liner of the chuck together with a plunger.

Referring now to FIG. 6 there is illustrated a view in perspective showing the liner 3 of the chuck 1 together with a plunger 10, this particularly making the four slotted-type slots 9 machined in the liner 3 evident, each of which serves to mount and guide a plunger 10. Preferably the height of each recess 9 is very accurately made to match the height of a plunger 10, so that the latter is mounted in the Z direction practically dead true in the slot 9 in achieving repeatedly exact positioning of the workpiece pallet 22 in the Z direction. Preferably, each recess 9 is higher by 1 to 5 microns than the front part 12 of each plunger 10 to be mounted therein. But, in any case, the plungers 10 are supported in the Z direction by the liner 3 by surface contact.

In addition, precisely matching the slotted-type recesses 9 to the plungers 10 prevents the ingress of dirt to a major extent. Also evident in the plungers 10 as shown are the cupped front part 12, the lower compression surface 13 and the round recess 14.

The advantages of the clamping device as shown and described involve, in particular, the solid structure of the chuck and the surface contact of the plungers with the workpiece pallet now enabling very high tensile forces to be handled by the workpiece pallet and respectively by the clamping device as a whole.

Clamping fixtures configured in accordance with the invention are particularly suitable—albeit not exclusively—for applications in powder presses wherein the ram for compacting the powder is secured to the workpiece pallet. But, in any case, the workpiece pallet can now handle high tensile and withdrawal forces as are needed in withdrawing the ram from the die.

Such clamping fixtures are, however, also suitable for use in multi-level systems comprising, on the one hand, several chucks coaxially stacked and, on the other several tools such as, for example, tubular rams arranged coaxial to each other.

Figure 7:
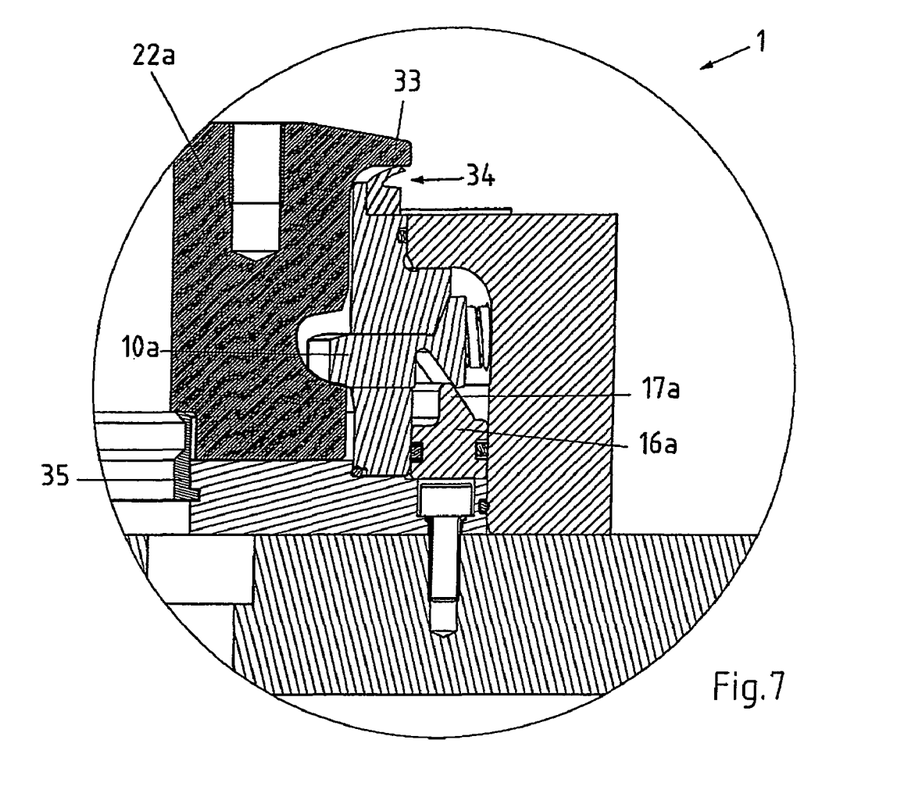
FIG. 7 is a view in vertical section through an alternative example aspect of the clamping fixture shown on a magnified scale.

Referring now to FIG. 7 there is illustrated a view in vertical section through an alternative example aspect of the clamping fixture shown on a magnified scale, but only a detail of the clamping fixture being evident. In this example the annular piston 16a provided for releasing the plungers 10a is arranged below the plungers 10a, the protuberance 17a serving to plunge the plungers 10a is arranged at the top side, but in turn assigned to the corresponding plunger 10a. The workpiece pallet 22a features at the top side a circumferential collar 33 protruding beyond the cylindrical shell surface of the workpiece pallet 22a radially. Arranged on the top side of the chuck 1a is a seal 34 which comes into contact with the underside of the circumferential collar 33 when clamping the workpiece pallet 22a in place. In the region of the bottom of the workpiece pallet 22a a further seal 35 is arranged which comes into contact with the underside of the workpiece pallet 22a. These two seals 34, 35 serve to seal the chuck 1a relatively safe from soilage, these seals 34, 35 protecting especially the sensitive members of the chuck 1a such as plungers 10a, piston 16a, etc., from dirt.

What is claimed is:

1. A clamping fixture including:
   a chuck (1) having a central aperture (4) extending therethrough;
   a base plate (5) defining supporting surfaces (7) disposed within the bottom of said central aperture (4) in said chuck (1); and
   a workpiece pallet (22) releasably located in the central aperture (4) of the chuck (1),
   wherein the chuck (1) is provided with a clamping mechanism for locating the workpiece pallet (22),
   wherein the clamping mechanism includes a plurality of clamping members configured as plungers (10) having a front part (12) provided with a compression surface (13) for surface contact with a clamping surface (28a) of the workpiece pallet (22),
   wherein the clamping surface (28a) runs essentially along a shell surface (26) of the workpiece pallet (22) and is configured to contact the plungers (10) during clamping,
   wherein workpiece pallet (22) comprises at its underside flat contact surfaces (25) which come into contact with said supporting surfaces (7) when the workpiece pallet (22) is clamped to the chuck (1) in a Z direction, and
   wherein the workpiece pallet (22) is provided with a through bore (29) to mount and locate a workpiece or a tool to the workpiece pallet.

2. The clamping fixture as set forth in claim 1, wherein the plungers (10) are plungable transversely to a longitudinal centerline (L) of said aperture (4).

3. The clamping fixture as set forth in claim 1, wherein said shell surface (26) is cylindrical.

4. The clamping fixture as set forth in claim 1, wherein said shell surface (26) defines an annular groove (27), said annular groove having one sidewall which forms a shoulder (28) serving as said clamping surface (28a).

5. The clamping fixture as set forth in claim 1, characterized in that the chuck (1) includes a solid liner (3) disposed within said central aperture having a surface for supporting the plungers (10) in the Z direction.

6. The clamping fixture as set forth in claim 5, characterized in that said liner (3) defines a plurality of slotted type recesses (9) for receiving a corresponding one of the plurality of plungers (10) mounted therein.

7. The clamping fixture as set forth in claim 6, characterized in that each recess (9) is between 1 and 5 microns higher than the part of a plunger (10) to be mounted therein.

8. The clamping fixture as set forth in claim 1, wherein the plungers (10) are loaded by means of compression springs (11), a longitudinal centerline of which runs parallel to the plunging direction of the plungers (10).

9. The clamping fixture as set forth in claim 1, characterized in that the chuck (1) includes centering members (6) which cooperate with further centering members (24) arranged on the workpiece pallet (22), said centering members and said further centering members configured such that the workpiece pallet (22) is positioned relative to the chuck (1) in the X and Y direction when engaged.

10. The clamping fixture as set forth in claim 1, characterized in that the chuck (1) comprises at least two plungers (10), each having a front part that defines at least one compression surface (13) each for surface contact with a clamping surface (28a) of the workpiece pallet (22), said compression surface (13) of the plungers (10) in all covering at least half of the circumference of the workpiece pallet (22).

11. The clamping fixture as set forth in claim 1, characterized in that the workpiece pallet (22) as viewed cross-sectionally is configured round or rectangular and characterized further that the workpiece pallet (22) defines a shell surface (26) having a circumferential groove (27), one sidewall of said circumferential groove forming a shoulder (28) configured as a clamping surface (28a) for the plungers (10).

12. The clamping fixture as set forth in claim 1, characterized in that the chuck (1) comprises at least four plungers (10) which are loaded by means of compression springs 11 such that a workpiece pallet (22) is mountably located in the chuck (1).

13. The clamping fixture as set forth in claim 12, characterized in that the chuck (1) is provided with at least one remotely activated actuator by means of which the plungers (10) can be plunged in overcoming the force of the compression springs (11).

14. The clamping fixture as set forth in claim 13, characterized in that the actuator is configured in the form of an annular piston (16) comprising a protuberance (17) featuring a ramped compression surface for plunging the plungers (10).

15. The clamping fixture as set forth in claim 1, characterized in that said clamping surface (28a) of the workpiece pallet (22) is ramped from the outside inwards and said front part (12) of the plungers (10) is adapted to the contour of the clamping surface (28a) of the workpiece pallet (22) such that the plungers (10) come into large surface contact with the clamping surface (28a) of the workpiece pallet (22).

16. A clamping fixture including:
a chuck (1); and
a workpiece pallet (22) releasably located thereon and including a clamping surface (28a),
wherein the chuck (1) is provided with a clamping mechanism for locating the workpiece pallet (22),
wherein the clamping mechanism includes a plurality of clamping members configured as plungers (10) having a front part (12) provided with a compression surface (13) for surface contact with the clamping surface (28a),
wherein the clamping surface (28a) runs essentially along a shell surface (26) of the workpiece pallet (22) and is configured to contact the plungers (10) during clamping,
wherein the workpiece pallet (22a) is provided at a top side thereof with a circumferential collar (33) which protrudes beyond the shell surface of the workpiece pallet (22a) radially,
wherein a seal (34) is provided at a top side of the chuck (1a), and
wherein said seal is arranged to come into contact with the underside of the circumferential collar (33) during clamping.

17. The clamping fixture as set forth in claim 16, wherein:
the plungers (10) are loaded by means of compression springs (11),
the chuck (1) is provided with at least one remotely activated actuator by means of which the plungers (10) can be plunged in overcoming the force of the compression springs (11), and
the actuator is configured in the form of an annular piston (16) comprising a protuberance (17) featuring a ramped compression surface for plunging the plungers (10).

18. The clamping fixture as set forth in claim 16, wherein the clamping mechanism comprises at least two plungers (10), each having a front part that defines at least one compression surface (13) each for surface contact with a clamping surface (28a) of the workpiece pallet (22), said compression surface (13) of the plungers (10) in all covering at least half of the circumference of the workpiece pallet (22).

19. A clamping fixture including:
a chuck (1);
a workpiece pallet (22) releasably located thereon and including a clamping surface (28a); and
a base body (2),
wherein the chuck (1) is provided with a clamping mechanism for locating the workpiece pallet (22),
wherein the clamping mechanism includes a plurality of clamping members configured as plungers (10) having a front part (12) provided with a compression surface (13) for surface contact with the clamping surface (28a),
wherein the clamping surface (28a) runs essentially along a shell surface (26) of the workpiece pallet (22) and is configured to contact the plungers (10) during clamping,
wherein the chuck includes a solid liner (3) having a surface for supporting the plungers (10) in a Z direction,
wherein the base body (2) includes a base part (2a) extending substantially radially, and
wherein said liner (3) is provided with a circumferential shoulder (15) supported in the tensile loading direction by surface contact with an underside of said base part (2a) of the base body (2).

20. The clamping fixture as set forth in claim 19, wherein:
the plungers (10) are loaded by means of compression springs (11),
the chuck (1) is provided with at least one remotely activated actuator by means of which the plungers (10) can be plunged in overcoming the force of the compression springs (11), and
the actuator is configured in the form of an annular piston (16) comprising a protuberance (17) featuring a ramped compression surface for plunging the plungers (10).

21. The clamping fixture as set forth in claim 19, wherein the clamping mechanism comprises at least two plungers (10), each having a front part that defines at least one compression surface (13) each for surface contact with a clamping surface (28*a*) of the workpiece pallet (22), said compression surface (13) of the plungers (10) in all covering at least half of the circumference of the workpiece pallet (22).

22. A clamping fixture comprising:
a chuck; and
a workpiece pallet releasably located thereon,
wherein the chuck includes a clamping mechanism for locating the workpiece pallet,
wherein the clamping mechanism includes a plurality of clamping members configured as plungers, the plungers having a front part provided with a compression surface for surface contact with a clamping surface of the workpiece pallet,
wherein the workpiece pallet comprises a clamping surface running essentially along its shell surface for contacting the plungers during clamping, and
wherein said compression surface contacts more than half of the clamping surface during clamping of the workpiece pallet.

23. The clamping fixture as set forth in claim 22, wherein:
the plungers are loaded by means of compression springs,
the chuck is provided with at least one remotely activated actuator by means of which the plungers can be plunged in overcoming the force of the compression spring, and
the actuator is configured in the form of an annular piston comprising a protuberance featuring a ramped compression surface for plunging the plungers.

24. The clamping fixture as set forth in claim 23, wherein the chuck comprises a central aperture configured to mount the workpiece pallet and that the plungers are plungable transversely to a longitudinal centerline of said aperture.

25. The clamping fixture as set forth in claim 24, wherein the workpiece pallet includes a through bore serving to mount and to locate a workpiece or tool to the workpiece pallet.

* * * * *